(12) United States Patent
Pliner (10) Patent No.: US 9,633,316 B2
(45) Date of Patent: Apr. 25, 2017

(54) PREDICTIVE MODELING BASED ON SUMMARY DATA AND MODELING USER'S AGE AT LINE LEVEL

(71) Applicant: Cellco Partnership, Basking Ridge, NJ (US)

(72) Inventor: Vadim Pliner, Fair Lawn, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 386 days.

(21) Appl. No.: 14/278,214

(22) Filed: May 15, 2014

(65) Prior Publication Data

US 2015/0332156 A1 Nov. 19, 2015

(51) Int. Cl.
*G06Q 10/06* (2012.01)
*G06Q 30/02* (2012.01)
*G06N 99/00* (2010.01)
*G06N 7/00* (2006.01)
*G06F 17/18* (2006.01)
*G05B 13/04* (2006.01)
*G06Q 30/00* (2012.01)

(52) U.S. Cl.
CPC .......... *G06N 99/005* (2013.01); *G05B 13/048* (2013.01); *G06F 17/18* (2013.01); *G06N 7/005* (2013.01); *G06Q 30/00* (2013.01)

(58) Field of Classification Search
None
See application file for complete search history.

*Primary Examiner* — Stanley K Hill
*Assistant Examiner* — Nathan Brown, Jr.

(57) ABSTRACT

A system and method are disclosed for classifying a record of data when the record of data does not contain class membership information. In one example, summary data is utilized with predictive modeling to predict the age range of a user of a line of service. A prior probability that a user within the summary data belongs to a respective class, a first conditional probability of a first predictor within the summary data and a second conditional probability of a second predictor within the summary data are calculated. For each record of data, a probability of class membership is calculated based on the calculated prior probability and the first and second conditional probabilities.

20 Claims, 3 Drawing Sheets

PREDICTIVE MODELING BASED ON SUMMARY DATA AND MODELING USER'S AGE AT LINE LEVEL

BACKGROUND

In recent years, mobile communication services have expanded and increased in popularity around the world. Many advanced networks offer various wireless mobile communication services for voice calls and data communications. The data communications services, for example, enable surfing the world wide web via a browser on a mobile device and receiving various data (including real-time data) from remote servers. Increasingly, mobile communication service providers, as well as other service and/or information providers, would like to target offerings to particular users based on the demographics of those users (e.g., age, interest(s), type of mobile device, usage of mobile communication services, etc.).

In many situations, a mobile communication service provider knows, for example, demographics related to the owner of an account for mobile communication services with that service provider. The owner of the account, however, may not be the only user of mobile communication services associated with the account. For example, the account represents multiple "lines" of service (e.g., a number of mobile devices/numbers on one family plan) with the service provider. Complete demographics for the additional users, however, are not necessarily available. While the service provider knows the amount of mobile communication services consumed (e.g., minutes of use, data transferred, number of messages exchanged, etc.) for each line, the service provider does not know, for example, the age and/or other demographic information for the particular person that most often uses each line.

Hence a need exists for predicting class membership (e.g., age range), and thus demographic information, for each line associated with an account for mobile communication services.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The probability that a particular event or condition A occurs is depicted as P(A) and the probability that another particular event or condition B occurs is depicted as P(B). The conditional probability that the event or condition A occurs given the event or condition B is depicted as P(A|B) and the conditional probability that the event or condition B occurs given the event or condition A is depicted as P(B|A). In Bayesian probability, P(A), often referred to as the prior, is the initial degree of belief in A and P(A|B), often referred to as the posterior, is the degree of belief having accounted for B.

In predictive modeling (e.g., supervised prediction, supervised learning) the training data set consists of observations (e.g., cases, records, examples, instances, etc.), for subjects for which relevant information is known. Associated with each observation is a vector of input variables (e.g., predictors, independent variables, features, explanatory variables,) and a target variable (e.g., response, outcome, dependent variable). The training data are used to construct a model that can predict the values of the target from the inputs. When the target is categorical, for example, the problem of predictive modeling is then known as supervised classification. The goal of supervised classification is creating a model (e.g., classifier) that can assign observations to one of a plurality of classes using the values of the inputs. A slightly more general problem aims at computing the probabilities of class membership. In other words, the objective is to find a probability $P(Y=c|X=x)$ for all classes $c=1, \ldots, k$, where Y is the target variable, X is the vector of inputs, and x is the vector of input values. Thus, in Bayesian terms, the belief that the target variable Y is a member of each class given the vector or range x of input values for each input X.

The training data set, for example, typically consists of observations of the form $(x_1, y_1), \ldots, (x_n, y_n)$. If the goal is to predict the gender of a purchaser of a particular item and/or service, for example, each observation might indicate a gender and a decision (e.g., (male, purchased), (male, not purchased), (female, purchased), (female, not purchased)). This is based on the assumption that complete historical data is available to create the training data set.

A problem arises when $y_1, \ldots, y_n$ are not available. That is, complete historical data, for at least one variable, is unavailable. For example, suppose Y is a binary outcome and Y=1 denotes purchasing a product or service while Y=0 denotes not purchasing the product or service. In this example, however, there is no historical purchase information available. The product or service, for example, is new on the market, the product/service is new for the specific company, and/or data on past purchases was not collected or kept. The question to be answered is "Who should be targeted by marketing campaigns in these situations?" If a survey has been conducted or can be conducted to help answer this question, it is feasible to use the survey findings to build a predictive model in order to answer the question. In some examples, relevant survey data can be purchased from companies/organizations conducting surveys and/or is available publicly. Because the question being asked is directed to a single product or service with an expected binary answer, conjoint analysis, although also utilizing survey data, cannot be applied. This is based on the lack of product profiles to choose from.

In one example, a predictive model is built on summarized data. To identify the most promising customers/users, for example, predictive models help estimate the probability to make a purchase or sign up for a service. In this example, P(Y=1|X=x) represents the probability to make the purchase or sign up for the service for the whole customer base. X, in this example, is a vector of customer characteristics/attributes. For example, X might represent gender while x is either male or female. Then, P(Y=1|X=x) represents the probabilities that purchasers are either male or female. Alternatively, or in addition to, X might represent age while x is a range of ages such as 13-17, 18-24, 25-34, 35-54 and 55+. Then, P(Y=1|X=x) represents the probabilities that purchasers are within a particular age range.

Traditional approaches to this problem include, but are not limited to, logistic regression, neural networks, decision trees, and naïve Bayes methods. In this example, however, these methods do not work when information on past purchases is not available. Although these methods do not work in this example, if findings of a survey where respondents were asked to express their interest in purchasing the product/service exist, the summarized data is used to build the predictive model.

Surveys are, for example, anonymous. Even if the survey is conducted among customers of a single company, for example, a match between survey responses and individual customers is not available. In addition to the primary preference question (e.g., "Would you purchase this product/service?"), questions, for example, about each respondent (e.g., demographics) are also asked. Results are known, for example, for the whole survey sample (e.g., P(Y=1) or the overall proportion of respondents who would be interested in making a purchase) as well as by sub-groups (e.g., (P(Y=1|gender='F') for women and P(Y=1|gender='M') for men), if questions regarding a sub-group are asked. The additional sub-group questions are denoted, for example, $X=(X_1, \ldots, X_k)$. For example, $X_1$ is gender, $X_2$ is age, $X_3$ is ethnicity, etc. and, for $X_1$, $x_1$ is male and $x_2$ is female while $x_i$ is each age range for $X_2$. Then $P(Y=1|X_i=x_i)$ for all $i=1, \ldots, k$ and all possible answers $x_i$ to question $X_i$ are known from the survey findings.

In those examples where survey data are available at the respondent level (e.g., individual answers to each question), the individual answers can be used to build a traditional predictive model (e.g. logistic regression) and the predictive model can be applied to the customer base. In the example where survey data is not available at the respondent level (e.g., only summarized data is available), however, the process described below still allows a predictive model to be built.

If a customer database, for example, contains the X attributes, a prediction about purchases can be made by estimating P(Y=1|X=x) for all combinations of values $x=(x_1, x_2, \ldots, x_k)$. For example, let us assume the X attributes include gender, age and household income. Then, the probability of Y=1 (i.e., product purchase) for a female of 35 years of age whose household income is $75 K+ is calculated, for example, as well as the probability of Y=1 for all other combinations of gender/age/income.

The prediction is achieved based on the following manipulations with conditional probabilities.

By Bayes' theorem, which expresses how a subjective degree of belief (in Y=1) should rationally change to account for evidence (X=x), $$P(Y=1|X=x)=P(X=x|Y=1)*P(Y=1)/P(X=x).$$

To estimate P(X=x|Y=1), conditional independence of X's given Y=1 is assumed (i.e., naïve Bayes assumption).

Then P(X=x|Y=1), which is $P(X_1=x_1, X_2=x_2, \ldots, X_k=x_k|Y=1)$, is replaced by $$\prod_{i=1}^{k} P(X_i=x_i|Y=1)$$

where $\Pi$ is the product of a sequence of terms, which results in:

$$P(Y=1|X=x) \approx P(Y=1)\prod_{i=1}^{k} P(X_i=x_i|Y=1)/P(X=x) \quad (1)$$

The naïve Bayes assumption is often violated, but the naïve Bayes method based on this assumption is successful in practice.

Given a similar expression to (1) for Y=0 (i.e., no product purchase), summing the right side of the similar expression with the right side of (1), and taking into account that P(Y=1|X=x)+P(Y=0|X=x)=1, the result is:

$$P(X=x) = \quad (2)$$
$$P(Y=1)\prod_{i=1}^{k} P(X_i=x_i|Y=1) + P(Y=0)\prod_{i=1}^{k} P(X_i=x_i|Y=0)$$

Replacing P(X = x) in (1) with (2), the result is:

$$P(Y=1|X=x) \approx \left[P(Y=1)\prod_{i=1}^{k} P(X_i=x_i|Y=1)\right] /$$
$$\left[P(Y=1)\prod_{i=1}^{k} P(X_i=x_i|Y=1) + P(Y=0)\prod_{i=1}^{k} P(X_i=x_i|Y=0)\right].$$

Applying again Bayes' theorem to $P(X_i=x_i|Y=1)$ and $P(X_i=x_i|Y=0)$, the final result is:

$$P(Y=1|X=x) \approx \left[\prod_{i=1}^{k} P(Y=1|X_i=x_i)P(X_i=x_i)\right] / \quad (3)$$
$$\left\{\prod_{i=1}^{k} P(Y=1|X_i=x_i)P(X_i=x_i) + \right.$$
$$\left. [P(Y=1)/P(Y=0)]^{k-1}\prod_{i=1}^{k} [1-P(Y=1|X_i=x_i)]P(X_i=x_i)\right\}$$

The expression (3) can easily be computed and all necessary information is available. $P(Y=1|X_i=x_i)$ are survey results by sub-group and $P(X_i=x_i)$ is calculated, for example, as frequencies using the customer database containing $X_i$. P(Y=1) is estimated, for example, from the survey results as the overall proportion of people who answered 'Yes' to the main survey question.

In some examples, however, the survey is conducted on a population which is different from a target population or the survey sample is not representative. In these examples, the difference between the survey population and the target population is accounted for, for example, by estimating P(Y=1) in the target population using the law of total probability. For any $X_i$ (i=1, \ldots, k), $$P(Y=1) = \sum_j P(Y=1 \mid X_i = x_j)P(X_i = x_j)$$

with the summation over all values of $X_i$. $P(Y=1|X_i=x_j)$ are, for example, survey results by sub-group. Estimating $P(X_i=x_j)$ on the target population, based on the assumption that the target population is different from the survey population, results in k estimates $P_i$ of $P(Y=1)$ (i.e., one result for each $X_i$) and the average $$(1/k)\sum_{i=1}^{k} P_i \text{ is the final estimate of } P(Y=1).$$

In a particular example, a mobile communication service provider desires to know an age range and/or other demographics information for all lines of service, particularly additional lines of service associated with an account of a primary user. The service provider collects and maintains mobile communication service usage data for each line of service. The service provider also collects and maintains, for example, age and/or other demographics information of the owner of an account. The service provider in our example, however, does not collect and maintain, for example, age and/or other demographics information of users of the additional lines of service associated with the account. Thus, an age range and/or other demographics information of a user of an additional line of service is predicted, for example, utilizing the above described techniques.

In this example, survey data is collected by a third-party unaffiliated with the service provider. Alternatively, or in addition, survey data may be collected directly by the service provider and/or based on actual usage of some subset of customers of the service provider. The survey data includes, for example, age range and/or other demographics information corresponding to some users of the service provider's communication services as well as some users of communication services of other service providers. Thus, the survey population (e.g., users of communication services of various service providers) is different than the target population (e.g., users of communication services of the service provider). Also, the survey data includes account holder information as well as information about users of additional lines. Furthermore, in the example, the survey data is summarized and/or otherwise not individually identifiable with a specific user. That is, the survey data, in one example, consists of the number of users that falls into each age range and/or other demographic category, as opposed to each individual user and their individual age and/or demographic information.

Although the examples here describe survey data related to usage of communication services, this is only for simplicity. Survey data, in particular demographics information of the survey population, may relate to other products and/or services not directly related to usage of communication services (e.g., car ownership status, make and model of owned car, home ownership status, etc.) insofar as the survey data is relatable to a predictor of the desired information to be predicted. Furthermore, although the examples refer to a single third-party supplier of survey data and/or a single collection of survey data, no such requirement exists. In the examples, survey data may be retrieved from more than one source and/or represent more than one collection of survey data.

The third-party survey data and the mobile communication service usage data collected by the service provider are utilized, for example, to generate distributions of potential predictors (e.g., distributions of potential predictors based on third-party survey data and distributions of potential predictors based on collected usage data) for identifying an age range and/or other demographics information of a user of a line of service of the service provider. The third-party survey data is validated, for example, by comparing each generated distribution for each potential predictor based on third-party survey data with each generated distribution for each potential predictor based on collected usage data. Prior probabilities for each age range or other demographics information category are calculated based on the survey data. The survey data is also utilized to calculate conditional probabilities for each age range or other demographics information category.

An age range or other demographics information category of each user is then predicted, for example, by calculating $$P(Y=k)\prod_{i=1}^{m} P(X_i = x_i \mid Y = k)$$

for each age range or other demographics information category based on the calculated prior probabilities and calculated conditional probabilities based on the summarized data. That is, for each age range (e.g., 13-17, 18-24, 25-34, 35-54, and 55+), the prior probability that a user belongs to that age range (i.e., $P(Y=k)$) is multiplied by the product of the sequence of conditional probabilities that a predictor, $X_i$, is within a specified range or has a specific value, $x_i$ under the condition that the user belongs to that age range (i.e., $\Pi P(X_i=x_i|Y=k)$). The user belongs in the age range or other demographics information category, for example, based on the category with the maximum result. In this way, a service provider may utilize summarized survey data to predict or otherwise estimate membership in a particular class (e.g., age range or other demographics information category) for an arbitrary user of a line of service.

Figure 1:
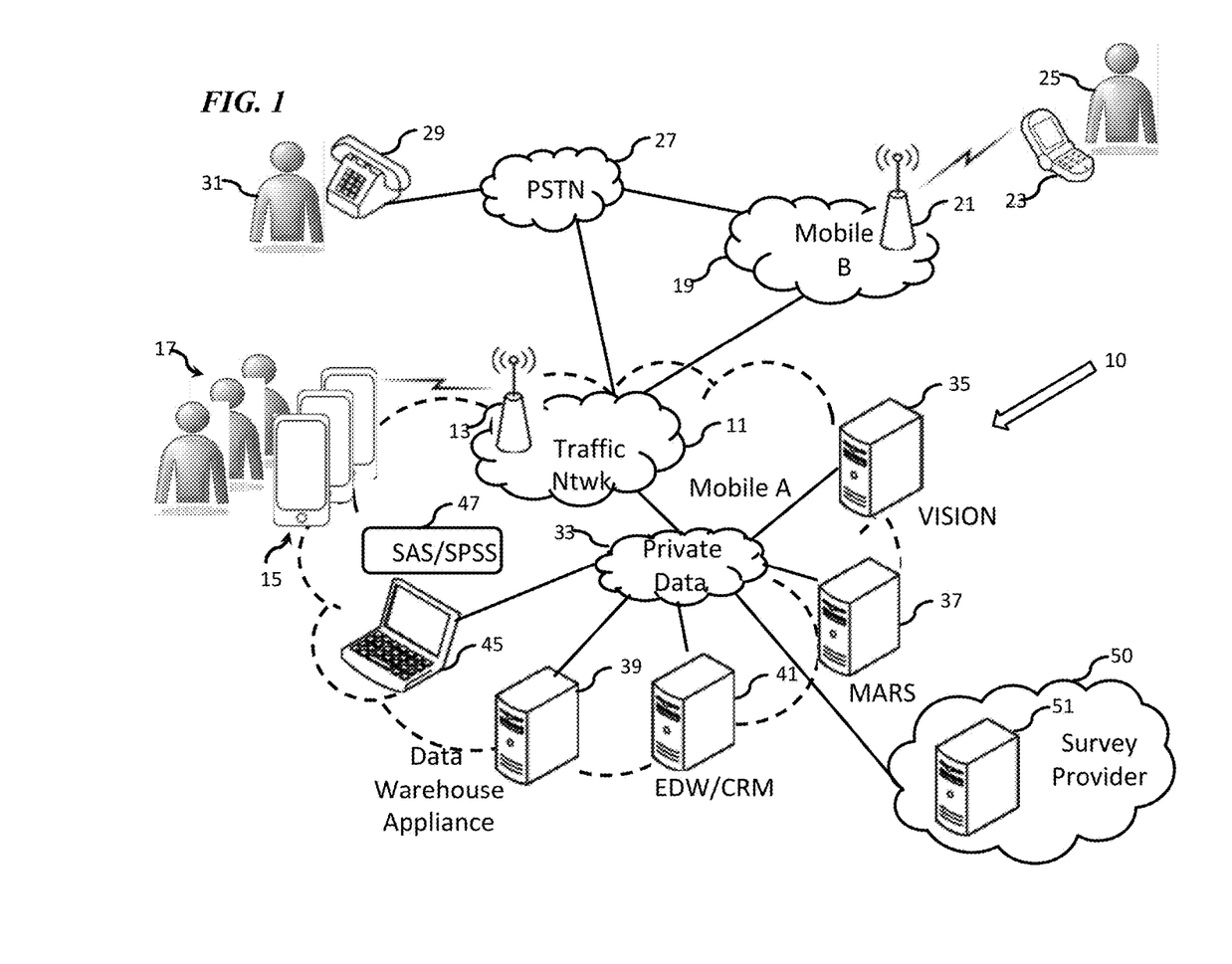
FIG. 1 is a functional block diagram of a mobile network and other networks with which the mobile network and its users may communicate, where the mobile network implements predictive modeling to predict class membership of a particular line of service.

Reference now is made in detail to the examples illustrated in the accompanying drawings and discussed below. FIG. 1 illustrates a system 10 of a carrier or service provider that may want to utilize the predictive modeling discussed herein. The carrier or provider is the operator of the system 10, which offers a variety of mobile communication services to mobile station users. The system or network 10 is the first of two mobile networks shown in the drawing for purposes of illustration and discussion of examples; and for convenience, that first mobile network 10 is identified in the drawing as the Mobile A network. That network 10 includes a mobile traffic network 11, which transports the actual user communications. The present technologies for predicting class membership of a user of a line of service may be used by various types of network communication service providers. However, for purposes of a detailed example, we will assume that the operator of the network/system 10 utilizes predictive modeling to identify customer characteristics as predictors of class membership and then applies a model developed from those predictors, to determine individual class membership of users of its mobile network service.

The mobile traffic portion 11 of the network 10 includes a number of base stations 13 as well as various transport media and switching or routing elements and the like (not separately shown) generally within the cloud of network 11.

Each base station 13 includes one or more base transceiver systems (BTS) that send and receive RF signals to/from mobile device 15 that are served by the respective base station 13. Later generation mobile networks utilize wireless access elements, each referred to as an eNodeB, to provide functions similar to those of a base station; but for convenience, the discussion here will generally include eNodeBs and other network wireless access devices under the general term base station.

The mobile traffic network 11 of the system 10 transports voice, data and mobile messaging communications over the air between the base stations and the mobile stations 15; and the switching/routing elements thereof provide transport for such mobile station communications between the base stations 13 (for mobile-to-mobile services) and between the base stations and network(s) providing communications with other user terminal devices, computer servers, etc. (for off-net communications). Specific elements of the mobile traffic network 11 for carrying the voice, data and mobile messaging traffic and for controlling various aspects of such user communications through the network 11 are omitted here for simplicity.

A user 17 may be a subscriber holding an account with the operator or may be any other user of a mobile device 15 affiliated with such a subscriber. Hence, for purposes of predictive modeling and associated class membership classification, the operator's customer base encompasses all users 17 of authorized activated devices 15 and thereby utilizes services of the mobile traffic network 11.

From the perspective of the users 17, the mobile traffic network 11 of the system 10 supports various types of communications with other users as well as with users and devices that communicate via other networks coupled to the traffic network 11. For example, a modern network such as 11 will typically provide data communications to/from the Internet (not shown). Of note for purposes of our discussion here, the traffic network 11 connects to a second mobile network (Mobile B) 19. Network 19 utilizes base stations such as 21 to communicate with mobile devices 23 including mobile devices of users 25 who are customers that subscribe to mobile network communication services of an operator of the second network 19. The network 19 may be similar to the network 10, although the networks 10 and 19 may utilize different wireless technologies and/or have different traffic network architectures. The mobile traffic network 11 also connects to a public switched telephone network (PSTN) 27 or the like to allow the users 17 to make voice calls to and receive voice calls from users 31 of landline telephones 29 connected to the network 27.

Mobile devices such as 15 and 23 in our example can take the form of portable handsets, smartphones, tablet computers or personal digital assistants, although the mobile devices may be implemented in other form factors.

In an example like that shown in FIG. 1 some users 17 are subscribers or other types of customers of the operator of the first network (Mobile A) 10, for the network communication services that the operator provides via the network 10. Users 25 are subscribers or other types of customers of the services that the operator of the second network (Mobile B) 19, for the network communication services that the operator provides via the network 19. Users 29 are subscribers or other types of customers of the operator of the network 27 providing PSTN type network communication services.

In most network service arrangements, the "subscriber" is the account holder. If an individual, the subscriber may also be an actual user. However, other users of the devices and services may be affiliated with a subscriber (e.g. a family member of a subscriber or an employee of an enterprise type subscriber). Subscribers and users affiliated with subscribers are examples of the customers within each network operator's customer base. The account records of the network operator typically identify the subscriber that holds the account and include information of various types about the subscriber, e.g. number of devices included in the subscription, services subscribed to in relation to each device, billing and other relevant addresses, payment history, etc. If an individual, the account record often includes address and age related data (e.g., birthday) for the identified subscriber/account holder. The account records may have some information about individual users on the account other than the actual account holder. However, on each account, the information in the operator's records will include a substantial amount of network service usage information for each line. The operator may also have access to other sources of information, e.g. credit history obtained at time of subscription, public records and/or social media, from which the operator may glean demographic and other data about users in its customer base.

In the simple example of FIG. 1, the operator of the network 10, the operator of the network 19 or the operator of the network 21 may utilize the predictive modeling and class membership classification to determine additional demographic information (e.g., age range) of the various users in addition to each subscriber with respect to their respective customers and possibly with respect to customers of the other carriers who use their respective networks from time to time. However, by way of a specific example for further discussion, we will assume that the predictive modeling and class membership classification is used by the operator of the first network (Mobile A) 10. From the perspective of the carrier/operator of the network 10, that enterprise would like to better tailor services and/or other offerings to existing users of its network communication services as well as potential new customers. Potential new customers may include users 25 who previously subscribed and received services through the second mobile network (Mobile B) 19 as well as users 25 who previously subscribed and received PSTN services through the network 27 and/or customers of other networks who roam onto network 11 or who communicate with devices 15 of customers 17.

As will be discussed more fully later, computer systems of the operator of network 10 can process electronic usage records and/or account records of subscribers to the network communication service, to identify existing demographics information and/or other usage-related statistics corresponding to existing users of communication services. Although usage records and/or existing demographics information may be available for users of each line of service represented by a single account (e.g., a number of mobile devices/numbers on one family plan), account record information, including additional demographics information (e.g., age or age range), typically only exists for the primary account holder. That is, the operator of network 10 has, for example, usage data for single line accounts as well as each line of multi-line accounts. The operator of network 10, however, may only have age and/or other demographics information for single line accounts and the account holder of each multi-line accounts. At the same time, the operator of network 10 may desire to identify the additional demographics information for the users of each additional line of service represented by each account. In doing so, the operator is able to, for example, develop and offer products and/or services more closely tailored to each user. By such computer analysis, systems of the operator of the network 10 may be able to identify the additional demographics information for the users of each additional line of service represented by each account.

The analysis examines communication data of existing customers as well as existing demographics information for each user (e.g., minutes of use (MOU), number of messages exchanged, type of mobile device utilized). The analysis also examines, for example, summarized usage records and/or account records of subscribers to network communication services provided by network 10 as well as other networks (e.g., 19 and 27). Such summarized usage records and/or account records is provided, for example, by a third-party who collects such information via surveys and/or other similar processes directly from subscribers who volunteer detailed information or by each network operator in cooperation with their respective subscribers. Such third-party survey provider is represented in FIG. 1 as Survey Provider 50. Survey provider 50 maintains such collected information in a database and/or other data repository, such as database server 51. In order to facilitate the analysis and exchange of summarized data, network 10 and survey provider 50 are in network communication via private data network 33. Although a single survey provider 50 is shown, this is only for simplicity. Survey data may be collected by and/or retrieved from one or more different sources.

A predictive modeling analysis like that outlined in general terms above can then be applied to analyze the information of the carrier's customer base. The predictive modeling is a statistical analysis of customer characteristics to identify those characteristics that appear most likely to be common amongst various classes of users (e.g., users belonging to one of many age ranges) and thus can be used to identify other users as potential members of each class, from amongst the operator's customer base. These customer characteristics that tend to be common amongst each class are referred to here as class "predictors."

In several specific examples discussed below, the statistical analysis used for the modeling operation essentially examines numbers of occurrences of various characteristics about the identified customers to identify those that appear statistically significant with respect to the identified customers. For example, the analysis may look for characteristics that appear to be more frequent or numerous amongst one class of customers, than amongst any other class or the more general customer base. The more general group of customers could encompass the entire customer base or could be a smaller group selected at random or in some other fashion that insures that the characteristics of the group adequately represent characteristics of the overall customer base. By predictive modeling with respect to information of the identified existing customers that may belong to a particular group, versus similar information of a random or other general subset of the operator's overall customer base, a profile can be developed that includes or is based on subscriber parameters selected in the modeling process as predictors of class membership.

The predictive modeling may be used to predict a desired characteristic for customers 17 that the carrier does not know from its account records. In several examples, the modeling analysis is used to classify users 17 into age range, particularly for lines other than the lines of account holders. Based on the tangible result of a predicted characteristic (e.g., age range) of each user, the operator of network 10 can take one or more appropriate actions (e.g., provide a targeted advertisement to the user, provide a targeted notification to the user, generate system warnings based on unexpected behavior, etc.).

With reference to the network 10, the carrier will also operate a number of systems that provide ancillary functions in support of the communications services and/or application services provided through the network 11, and those elements communicate with nodes or elements of the network 11 via one or more private IP type packet data networks 33 (sometimes referred to as an Intranet). Generally, such systems are part of or connected for communication via the private network 33. Although the operator of network 10 may utilize any number of different systems in or connected via the network 33, the discussion here will focus on several computer systems or applications that may be involved in predictive modeling to determine membership in a particular class from among the operator's customer base for use in developing products and/or services tailored to each class.

Hence, in our example, the operator's network 10 includes a system of record, for maintaining various subscriber account records, which in the example is a Virtual Information System Integrated Online Network ("VISION") server computer system 35. In at least some mobile networks, the VISION server system 35 is the main billing system used to house customer information and make changes to a customer's service profile. For example, if a customer selects to purchase a service or device upgrade, the appropriate account record VISION server 35 is updated to reflect that the particular customer has purchased the upgrade. A large carrier typically has a number of such systems, and the system that stores the account data for a particular subscriber may be referred to as the "system of record" for that subscriber's account, including records for all users/devices under that account. Of note for purposes of the predictive modeling, every mobile device 15 that is currently activated for service via the traffic network 11 is identified in a subscriber account record maintained by an instance of the operator's VISION system of record 35, although accounts of at least some subscribers may include records for a number of the mobile devices 15. Each user 17 in the customer base thus has a corresponding record for each device 15 that the user utilizes via the network 11. As new users become customers and newly activate mobile devices 15 on the network 11, corresponding new account records are set-up in the VISION server computer system 35. The account records in the VISION system 35 will indicate date of activation.

As users 17 operate mobile devices 15 and communicate through the mobile traffic network 11, elements of that network 11 monitor service usage and compile electronic service usage records of subscriber communications through the network 11. For voice calls, for example, such records often take the form of call detail records (CDRs). For data communication, such as email, instant messaging and web browsing, the service usage records may take the form of usage data records (UDRs). Other types of records may be compiled for mobile messaging service communications through the network 11. Although there may be other computer systems involved in processing such electronic service usage records of subscriber communications generated by the network 11, for purposes of our example, the service usage records are communicated through the private data network 33 to the VISION system, e.g. for further processing to generate bills and/or associated reports for services with respect to each subscriber account. These electronic service usage records may include records of communications with users such as 25 and 29, who receive services through the other networks 19 and 27.

Another type of system that the operator of network 10 may utilize to provide ancillary functions via the private IP data network 33 is a Media Resource Server (MARS) 37. Although the MARS computer system 37 may be configured to provide a variety of other functions, for the predictive modeling, the MARS computer system 37 receives and processes usage data records (such as CDRs), e.g. from the VISION system 35.

The operator of network/system 10 in our example also operates one or more data warehouse systems for processing account information and usage data records from the MARS and/or VISION systems 35, 37. A data warehouse or enterprise data warehouse (DW, DWH, or EDW) is a database, for example, created by integrating data from data disparate sources of the enterprise (e.g. the network operator in the example). Depending on the purpose of the enterprise operating the data warehouses, in this case, the network operator, one or more of the data warehouses may store historical data as well as current data.

Hence, our example of network/system 10 includes a data warehouse appliance 39, such as a Teradata 2550. Our example also includes a computer system 41 configured as an enterprise data warehouse (EDW) that supports a customer relationship management (CRM) function. Customer relationship management (CRM) is a model for managing a company's interactions with current and future customers in an organized way. Although shown as separate server type computer platforms, the warehouse and/or CRM functions may be implemented as software functionalities running on any one or more suitable computers.

Data from the data warehouse system(s) is processed in one or more further computers (e.g., 45, 47) to develop a class membership model, and that model is applied to data about the operator's customers to score the customers vis-à-vis the customers' potential to be a member of a particular class. The scoring results in turn can be used to tailor products and/or services for each particular class of user and target such tailored offerings to users identified as a member of each particular class. This additional processing to develop the model, score the customers and select customers for product, promotions, and/or service targeting may be implemented as software running on one or more of the computers discussed so far or on additional computers. The drawing shows a user terminal device such as a laptop computer device 45 for use by appropriate personnel. Such a terminal provides a user interface to relevant data and may run some relevant processing software.

For example, for the class membership modeling step, a hardware computer platform will run an appropriate software tool 47, such as SAS Analytics software (from SAS Institute Inc.) or SPSS predictive analytics software (from IBM), to perform a statistical analysis of various information about the customers 17 and build a model of class predictors. The modeling tool 47 may run on a personal computer or the like that is the user terminal device 45. Alternatively, the modeling tool 47 may run in a server environment, in which case, the terminal device 45 communicates with the server(s) and provides a user interface for accessing the modeling tool 47. The terminal device 45 may also provide access to the CRM function of system 41, for example, to allow carrier personnel to access and manipulate data to develop a product, promotion, and/or service offering involving communications with customers 17 of the network operator.

Figure 2:
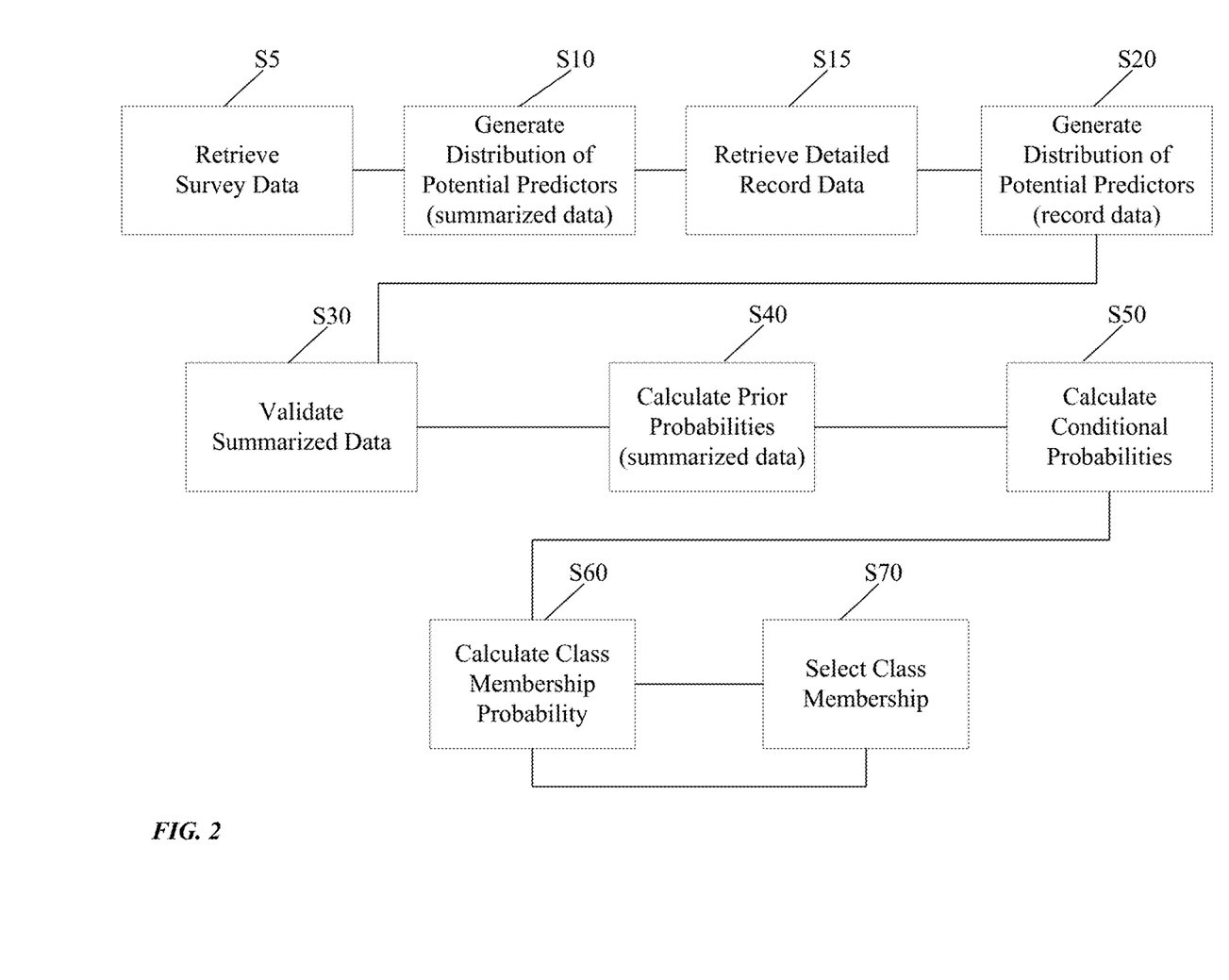
FIG. 2 is a process flow diagram of an example of a method for predicting class membership based on summarized data and application of predictors to line record data.

FIG. 2 illustrates a method for predicting class membership based on summarized data and application of predictors to line record data. In step S5 of FIG. 2, survey data is retrieved. For example, survey data is retrieved from survey provider 50 via private data network 33. In step S10, a distribution of each potential predictor within the survey data is generated. That is, if minutes of use is one potential predictor, then a distribution of minutes of use (i.e., number of users whose minutes of use fall within each range) is generated. Each distribution of potential predictors is generated by summarizing, for example, results from a survey or otherwise historical data reflecting demographics and/or other information corresponding to individuals. In this example, summarizing is computing the frequency of each value of each potential predictor as contained in the survey results or otherwise historical data.

In step S15, detailed record data based on data collected and maintained by an enterprise or other organization corresponding to customers and/or other individuals associated with the enterprise or other organization is retrieved. For example, individual usage records for all and/or some subset of lines of service are retrieved from a data warehouse, such as EDW 41 of FIG. 1. In step S20, a distribution of each potential predictor within the detailed record data is generated. The data collected and maintained by the enterprise or other organization is, for example, individually identifiable and/or uniquely associated with an individual (e.g., past purchase(s), current usage(s), identified preference(s), etc.).

In some examples, the summarized data represents the same information collected and maintained by the enterprise or other organization for the same set of individuals. In other examples, the summarized data represents the same information collected and maintained by the enterprise or other organization, but for a different set of individuals. In still other examples, the summarized data represents either more or less information then the information collected and maintained by the enterprise or other organization for either the same or different set of individuals. That is to say, the summarized data may be a summary of the collected and maintained information; the summarized data may be a summary of information that is the same as the collected and maintained information for the same set or some subset of individuals, but collected and maintained by another enterprise or other organization; or the summarized data may be a summary of similar information collected and maintained by another enterprise or other organization, but for a different set of individuals that may include some individuals associated with the enterprise. In one example, the summarized data includes an indication of class membership (e.g., age range, gender, etc.). In another example, the summarized data does not include an indication of class membership.

In step S30, the summarized data is validated. For example, the distribution based on survey results or otherwise historical data generated in step S10 and the distribution based on collected and maintained data generated in step S20 are compared for each potential predictor. The comparison is performed, for example, by computing the difference between the frequency of the same value in each of the two sets of data (i.e., survey results or otherwise historical data from step S10 and collected and maintained data from step S20). If all of the differences are small enough, the summarized data is deemed valid.

In step S40, prior probabilities (i.e., P(Y=k)) are calculated based on the summarized data. That is, the probability that a particular record from the summarized data is a member of a particular class is calculated.

In step S50, conditional probabilities (i.e., $P(X_i=x_i|Y=k)$) are calculated based on the summarized data. That is, the probability that a particular predictor is within a specified range or has a specific value under the condition that the user is a member of a class is calculated.

In general, steps S10-S50 are taken to develop an appropriate predictive model. In steps S60-S70, the developed predictive model is utilized to predict class membership for a particular record from the data collected and maintained by the enterprise or other organization. Specifically, in step S60, the probability that a particular record from the collected and maintained data belongs to each potential class is calculated using the formula $P(Y=k)\Pi P(X_i=x_i|Y=k)$. That is, if there are, for example, five potential classes (e.g., 13-17 years old, 18-24 years old, 25-34 years old, 35-54 years old, and 55+ years old), the probability that the record belongs to each class is calculated. In other words, five probabilities, one for each class, are calculated. In step S70, class membership is selected based on the calculated probability with the maximum value. That is, if the third probability (e.g., 25-34 years old) is, for example, the maximum value, then the particular record is assigned to the third class (e.g., 25-34 years old). Steps S60 and S70 are then repeated for each record in the collected and maintained data or for some subset of records.

In a further detailed example, a service provider desires to predict the age range of a user of a line of service. In step S40, it is determined, for example, that the prior probabilities are:

13-17 years old=>0.3

18-24 years old=>0.3

25-34 years old=>0.2

35-54 years old=>0.1

55+ years old=>0.1

In step S50, it is determined, for example, that the conditional probabilities for each of three predictors are, for example, those values reflected in Tables 1-2 below.

TABLE 1

| | MOU | | | | | |
|---|---|---|---|---|---|---|
| Age | 0-100 | 101-250 | 251-400 | 401-550 | 551-1000 | >1000 |
| 13-17 | 0.28 | 0.27 | 0.15 | 0.11 | 0.13 | 0.06 |
| 18-24 | 0.1 | 0.19 | 0.16 | 0.25 | 0.25 | 0.17 |
| 25-34 | 0.07 | 0.13 | 0.15 | 0.27 | 0.27 | 0.26 |
| 35-54 | 0.11 | 0.16 | 0.15 | 0.24 | 0.24 | 0.21 |
| 55+ | 0.25 | .2 | 0.16 | 0.16 | 0.16 | 0.12 |

TABLE 2

| Age | Touchscreen Device Owner | XYZ Device Owner |
|---|---|---|
| 13-17 | 0.26 | 0.03 |
| 18-24 | 0.46 | 0.07 |
| 25-34 | 0.51 | 0.1 |
| 35-54 | 0.36 | 0.11 |
| 55+ | 0.2 | 0.05 |

In step S60, it is determined, for example, the probability that a particular user of a line of service belongs to each age range. It is known, for example, that the particular user has 75 minutes of use (MOU), owns a touchscreen device and does not own an XYZ device, such as a particular brand (e.g., low volume or high volume). As such, the following class membership probabilities are calculated:

13-17 years old=0.3×0.28×0.26×0.97=0.0212

18-24 years old=0.3×0.1×0.46×0.93=0.0128

25-34 years old=0.2×0.07×0.51×0.9=0.0064

35-54 years old=0.1×0.11×0.36×0.89=0.0035

55+ years old=0.1×0.25×0.2×0.95=0.0048

Based on these calculations, the class membership for this particular user would be, for example, 13-17 years old, in step S70, because 0.0212 is the maximum value.

As can be seen from the examples above, summarized survey data is utilized to generate a predictive model and the predictive model is applied to detailed record data corresponding to an individual to predict a particular trait and/or characteristic of the corresponding individual. In this way, an enterprise or other organization can better identify existing customers and tailor future offerings (e.g., products, services, advertisements, etc.) more closely to those identified customers. Although the above examples focus on applying the predictive model to mobile communications services and/or related products, no such requirement exists. The techniques and processes for utilizing summarized survey data to generate a predictive model to be applied to detailed record data for predicting a particular trait and/or characteristic can be used in any situation for which summarized survey data provides at least one reliable potential predictor.

As shown by the discussion above, aspects of predicting class membership based on summarized data may be implemented on appropriately configured network connected computers or the like. A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the user applications, and/or push client or push server applications. The software code is executable by the general-purpose computer that functions as the push server and/or that functions as a push client on a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for handling failed messages in a push platform, in essentially the manner performed in the implementations discussed and illustrated herein.

Figures 3, 4:
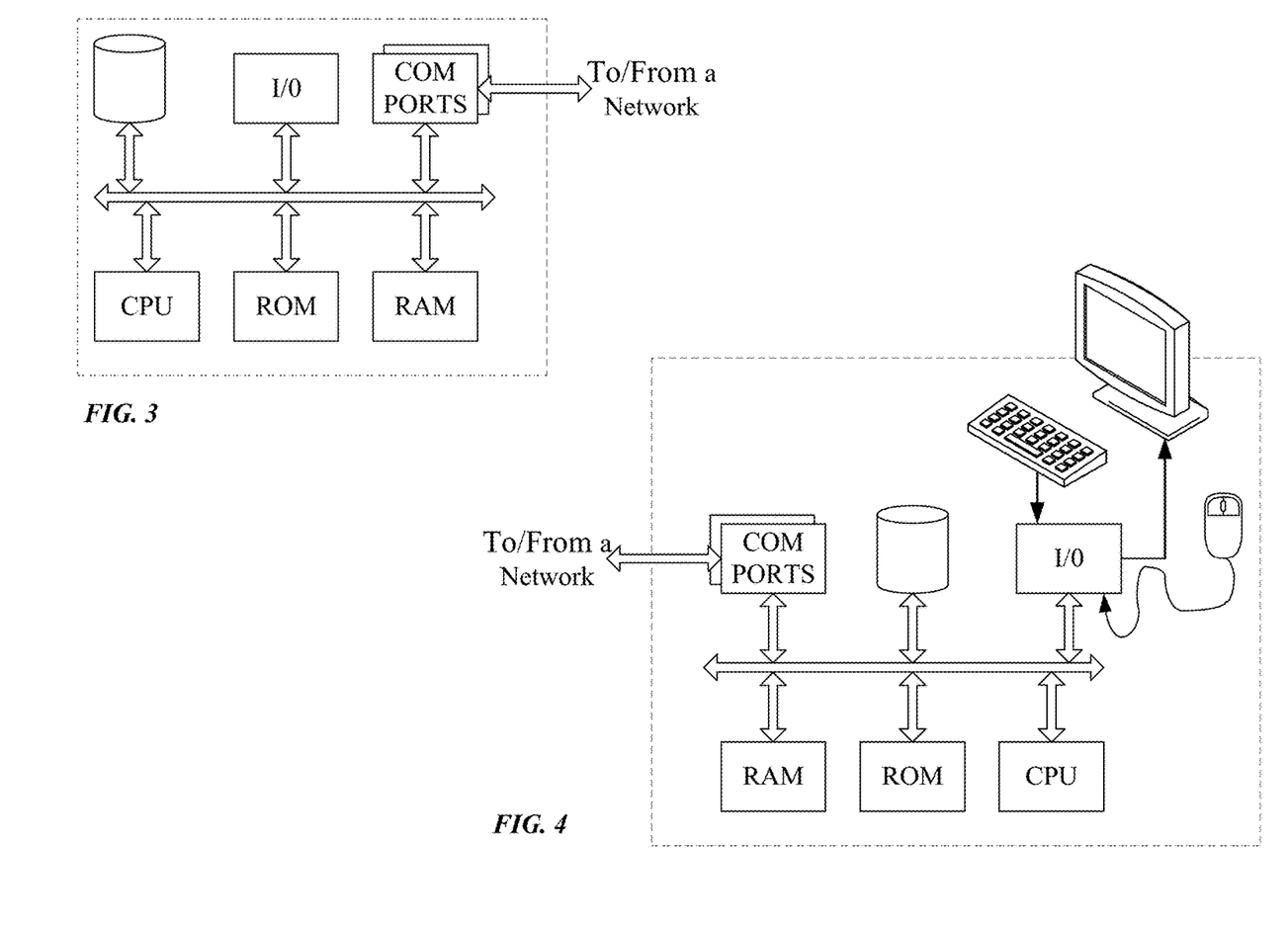
FIG. 3 is a simplified functional block diagram of a computer that may be configured as a host or server, as shown in the system of FIG. 1.
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that the general structure and general operation of such equipment as shown in FIGS. 3 and 4 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 3). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of handling failed messages in a push platform outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the application server that will be the push server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the handling of failed messages in a push platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer comprising:
    a processor;
    a memory; and
    a class membership prediction program in the memory, execution of the class membership prediction program by the processor configuring the computer to implement functions, including functions to:
        for each class of a plurality of classes, calculate a prior probability that a user belongs to the respective class based on sample data of usage and demographic information of users of a product or service,
            the sample data including an indicator of membership in each class correlated to the sample data of usage and/or the demographic information;
        for at least a first predictor of a class of membership in the sample data, calculate a respective first conditional probability that the first predictor is within a first predetermined range or has a first predetermined value given a condition that a user of the product or service is a member of each respective class;
        for at least a second predictor of the class of membership in the sample data, calculate a respective second conditional probability that the second predictor is within a second predetermined range or has a second predetermined value given the condition that the user of the product or service is a member of each respective class; and
        for each record of detailed data of usage and demographic information of a plurality of users of the product or service:
            calculate, for each respective class, a probability of membership that a user corresponding to the record of detailed data is a member of each respective class based on the respective prior probability and the first and second respective conditional probabilities,
                the record of detailed data not including an indicator of the class of membership; and
            predict the class of membership of the user corresponding to the record of detailed data by selecting as the class of membership the class with a maximum calculated probability of membership for the record of detailed data.

2. The computer of claim 1, wherein each class corresponds to a range of ages.

3. The computer of claim 1, wherein the sample data consists of summarized data reflecting only a total number of records from the sample data that corresponds to each class correlated to the sample data of usage and/or the demographic information.

4. The computer of claim 1, wherein:
    the product or service is mobile communication services of a mobile communications provider; and
    the first predictor is one of:
        minutes of use of users of mobile communications services;
        number of short message service messages exchanged;
        ownership of a touchscreen mobile device; or
        ownership of a particular brand of mobile device.

5. The computer of claim 4, wherein the second predictor is another one of:
    minutes of use of users of mobile communications services;
    number of short message service messages exchanged;
    ownership of a touchscreen mobile device; or
    ownership of a particular brand of mobile device.

6. The computer of claim 1, wherein the probability of membership is calculated based on the formula $$P(Y=k)\prod_{i=1}^{m} P(X_i = x_i \mid Y=k)$$

wherein:
    $P(Y=k)$ is a prior probability of membership in a particular class $Y=k$;
    each $P(X_i = x_i \mid Y=k)$ is a conditional probability that the first and second predictors have particular values under a condition of membership in the particular class $Y=k$;
    $\pi$ is a product of a sequence;
    m is a total number of predictors;
    i is a variable ranging from 1 to m representing a particular one of the predictors;
    k is each class of the plurality of classes;
    $X_i$, is each predictor of class membership; and
    $x_1$, is a value corresponding to each predictor of class membership included in each record of detailed data.

7. The computer of claim 1, execution of the class membership prediction program further configuring the computer to implement functions, including functions to:
    generate a first distribution of potential predictors of the class of membership based on the sample data;
    generate a second distribution of potential predictors of the class of membership based on the detailed data; and
    validate the sample data based on a comparison of the first distribution and the second distribution for each potential predictor.

8. A method, comprising the steps of:
    for each class of a plurality of classes, calculating, by a computer and based on sample data of usage and demographic information of users of a product or service, a prior probability that a user belongs to the respective class, the sample data including an indicator of membership in each class correlated to the sample data of usage and/or the demographic information;
    for at least a first predictor of a class of membership in the sample data, calculating, by the computer and based on the sample data, a respective first conditional probability that the first predictor is within a first predetermined range or has a first predetermined value given a condition that a user of the product or service is a member of each respective class;

for at least a second predictor of the class of membership in the sample data, calculating, by the computer and based on the sample data, a respective second conditional probability that the second predictor is within a second predetermined range or has a second predetermined value given the condition that the user of the product or service is a member of each respective class; and for each record of detailed data of usage and demographic information of a plurality of users of the product or service:

calculating, by the computer and for each respective class, a probability of membership that a user corresponding to the record of detailed data is a member of each respective class based on the respective prior probability and the first and second respective conditional probabilities, the record of detailed data not including an indicator of the class of membership; and predicting, by the computer, the class of membership of the user corresponding to the record of detailed data by selecting as the class of membership the class with a maximum calculated probability of membership for the record of detailed data.

9. The method of claim 8, wherein each class corresponds to a range of ages.

10. The method of claim 8, wherein the sample data consists of summarized data reflecting only a total number of records from the sample data that corresponds to each class correlated to the sample data of usage and/or the demographic information.

11. The method of claim 8, wherein:
the product or service is mobile communication services of a mobile communication provider; and
the first predictor is one of:
minutes of use of users of mobile communications services;
number of short message service messages exchanged;
ownership of a touchscreen mobile device; or
ownership of particular brand of mobile device.

12. The method of claim 11, wherein the second predictor is another one of:
minutes of use of users of mobile communications services;
number of short message service messages exchanged;
ownership of a touchscreen mobile device; or
ownership of a particular brand of mobile device.

13. The method of claim 8, wherein the probability of membership is calculated based on the formula $$P(Y=k) \prod_{i=1}^{m} P(X_i = x_i \mid Y = k)$$

wherein:
P(Y=k) is a prior probability of membership in a particular class Y=k;
each $P(X_i=x_i \mid Y=k)$ is a conditional probability that the first and second predictors have particular values under a condition of membership in the particular class Y=k;

π is a product of a sequence;
m is a total number of predictors;
i is a variable ranging from 1 to m representing a particular one of the predictors;
k is each class of the plurality of classes;
$X_i$ is each predictor of class membership; and
$x_i$ is a value corresponding to each predictor of class membership included in each record of detailed data.

14. The method of claim 8, further comprising the steps of:
generating, by the computer and based on the sample data, a first distribution of potential predictors of the class of membership;
generating, by the computer and based on the detailed data, a second distribution of potential predictors of the class of membership; and
validating, by the computer, the sample data based on a comparison of the first distribution and the second distribution for each potential predictor.

15. An article of manufacture, comprising:
at least one non-transitory machine-readable storage medium; and
programming instructions embodied in the at least one medium for execution by one or more computers to be capable of performing functions, the functions comprising:

for each class of a plurality of classes, calculating, by a computer and based on sample data of usage and demographic information of users of a product or service, a prior probability that a user belongs to the respective class, the sample data including an indicator of membership in each class correlated to the sample data of usage and/or the demographic information;

for at least a first predictor of a class of membership in the sample data, calculating, by the computer and based on the sample data, a respective first conditional probability that the first predictor is within a first predetermined range or has a first predetermined value given a condition that a user of the product or service is a member of each respective class;

for at least a second predictor of the class of membership in the sample data, calculating, by the computer and based on the sample data, a respective second conditional probability that the second predictor is within a second predetermined range or has a second predetermined value given the condition that the user of the product or service is a member of each respective class; and for each record of detailed data of usage and demographic information of a plurality of users of the product or service:

calculating, by the computer and for each respective class, a probability of membership that a user corresponding to the record of detailed data is a member of each respective class based on the respective prior probability and the first and second respective conditional probabilities, the record of detailed data not including an indicator of the class of membership; and predicting, by the computer, the class of membership of the user corresponding to the record of detailed data by selecting as the class of membership the class with a maximum calculated probability of membership for the record of detailed data.

16. The article of manufacture of claim 15, wherein each class corresponds to a range of ages.

17. The article of manufacture of claim 15, wherein:
the product or service is mobile communication services of a mobile communications provider; and
the first predictor is one of:
minutes of use of users of mobile communications services;
number of short message service messages exchanged;
ownership of a touchscreen mobile device; or
ownership of particular brand of mobile device.

18. The article of manufacture of claim 17, wherein the second predictor is another one of:
minutes of use of users of mobile communications services;
number of short message service messages exchanged;
ownership of a touchscreen mobile device; or ownership of a particular brand of mobile device.

19. The article of manufacture of claim 15, wherein the probability of membership is calculated based on the formula $$P(Y=k)\prod_{i=1}^{m} P(X_i = x_i \mid Y = k)$$

wherein:
P(Y=k) is a prior probability of membership in a particular class Y=k;
each $P(X_i=x_i \mid Y=k)$ is a conditional probability that the first and second predictors have particular values under a condition of membership in the particular class Y=k;
π is a product of a sequence;
m is a total number of predictors;
i is a variable ranging from 1 to m representing a particular one of the predictors;
k is each class of the plurality of classes;
$X_i$ is each predictor of class membership; and
$x_i$ is a value corresponding to each predictor of class membership included in each record of detailed data.

20. The article of manufacture of claim 15, the functions further comprising:
generating, by the computer and based on the sample data, a first distribution of potential predictors of the class of membership;
generating, by the computer and based on the detailed data, a second distribution of potential predictors of the class of membership; and
validating, by the computer, the sample data based on a comparison of the first distribution and the second distribution for each potential predictor.

* * * * *